(12) United States Patent
Fujii et al.

(10) Patent No.: US 7,075,566 B2
(45) Date of Patent: Jul. 11, 2006

(54) VIDEO DISPLAY APPARATUS (75) Inventors: Kyoichiro Fujii, Tokyo (JP); Koichi Ishitoya, Tokyo (JP); Takayuki Akimoto, Tokyo (JP)

(73) Assignee: Pioneer Corporation, Tokyo (JP)

( * ) Notice: Subject to any disclaimer, the term of this patent is extended or adjusted under 35 U.S.C. 154(b) by 533 days.

(21) Appl. No.: 10/270,535

(22) Filed: Oct. 16, 2002

(65) Prior Publication Data

US 2003/0098911 A1  May 29, 2003

(30) Foreign Application Priority Data

Nov. 27, 2001  (JP) ............................. 2001-360716

(51) Int. Cl.
*H04N 17/00* (2006.01)
(52) U.S. Cl. ..................... 348/192; 348/181; 348/180
(58) Field of Classification Search ................ 348/181, 348/180, 192, 177, 189, 182; 725/107, 109, 725/118, 120; 455/88, 115.1, 115.2, 115.3, 455/226.1; 345/904, 204, 214; 714/799, 714/750, 712
See application file for complete search history.

(56) References Cited

U.S. PATENT DOCUMENTS

| | | | | |
|---|---|---|---|---|
| 5,446,492 A * | 8/1995 | Wolf et al. | .................. | 348/192 |
| 5,874,992 A * | 2/1999 | Caporizzo | .................... | 348/192 |
| 6,055,015 A * | 4/2000 | Edwards | ...................... | 348/192 |
| 6,259,477 B1 * | 7/2001 | Hu | ............................... | 348/180 |
| 6,337,711 B1 * | 1/2002 | Dickinson et al. | ........... | 348/192 |
| 6,380,971 B1 * | 4/2002 | Brodigan | ..................... | 348/180 |
| 6,496,221 B1 * | 12/2002 | Wolf et al. | ................. | 348/192 |
| 6,618,077 B1 * | 9/2003 | Baina et al. | ................. | 348/192 |
| 6,637,001 B1 * | 10/2003 | Minamida | .................... | 714/776 |
| 6,839,055 B1 * | 1/2005 | Nguyen | ....................... | 345/204 |

FOREIGN PATENT DOCUMENTS

EP         0 631 401 A1     12/1994

OTHER PUBLICATIONS

Japanese Abstract No. 2000101514, dated Apr. 7, 2000.
Japanese Abstract No. 06232818, dated Aug. 19, 1994.

* cited by examiner

*Primary Examiner*—David Ometz
*Assistant Examiner*—Jean W. Désir
(74) *Attorney, Agent, or Firm*—Sughrue Mion, PLLC (57) ABSTRACT

A display having separate transmitting and receiving sets is provided with a feature to simplify adjustment to the video signal transmission path between the both sets. The display employs a directional video signal transmission path and a sub communication path using a non-directional communication medium independent from the transmission path. Fine adjustment to subtly adjust the spatial matching of the video signal transmission path is carried out using a control signal transmitted through the sub communication path. Coarse adjustment to roughly adjust the spatial matching of the video signal transmission path is carried out using a test video image displayed at the display portion of the receiving set. These fine adjustment and coarse adjustment are combined to keep an optimum spatial matching of the video signal transmission path between the sets.

8 Claims, 9 Drawing Sheets

\* 1 : 1HzBPF OUTPUT

FIG. 4B

\* 2 : 10HzBPF OUTPUT

*1 : 1HzBPF OUTPUT

FIG. 7A

*1 : 1HzBPF OUTPUT

FIG. 6B

*2 : 10HzBPF OUTPUT

*2 : 10HzBPF OUTPUT

*1 ; BLUE LIGHT RECEIVING ELEMENT OUTPUT

FIG. 9B

*2 ; RED LIGHT RECEIVING ELEMENT OUTPUT $$V1 = V2$$

WHERE V1 & V2 BOTH INDICATE AVERAGE VALUE OF OUTPUT LEVELS

VIDEO DISPLAY APPARATUS

BACKGROUND OF THE INVENTION

1. Field of the Invention

The present invention relates to a video display apparatus including a transmitting side set that transmits a video signal and a receiving side set that displays an image on a display screen based on the video signal received from the transmitting side.

2. Description of Related Art

In recent years, the price of AV (audiovisual) equipment has been reduced while achieving improvement in performance. Particularly, thin-shape video display apparatus having a display screen such as a PDP or a liquid crystal display panel have rapidly been spreading throughout general households. In these kinds of video display apparatus, the screen and the control device must be separately installed because of their thin-shape design. Therefore, the video display apparatus often employs an arrangement having separate sets on the transmitting and receiving sides. The transmitting side set (hereinafter simply as the "transmitting set") includes a video signal generating portion such as a satellite broadcasting tuner and a DVD player. The receiving side set (hereinafter simply as the "receiving set") includes a display screen.

In the separate type video display apparatus, a highly directional radio communication medium using microwaves in the SHF band or light such as an infrared beam is used to transmit video signals, the associated audio signals, and information such as control signals from the transmitting set to the receiving set. In this case, in order to secure a good transmission state of signals between the transmitting and receiving sets, the spatial matching of the signal transmission path must be adjusted between these sets.

In a conventional video display apparatus, at the receiving set, the received state of a test signal transmitted from the transmitting set must always be measured to adjust the orientation of the transmitting set or the direction of the transmitting output so that the received state of the test signal is optimized. This adjusting operation should be performed by at least a pair of workers. When the positional relation between the transmitting and receiving sets changes for some reason, the adjusting operation must be carried out once again, which will result in the reduction in efficiency.

SUMMARY OF THE INVENTION

The invention is directed to a solution to the disadvantage, and it is an object of the invention to provide a video display apparatus allowing the communication path between the transmitting and receiving sets to be easily adjusted.

A video display apparatus according to the invention includes a transmitting set that transmits a video signal through a main communication path including a directional wireless communication medium, and a receiving set including a display portion that displays a video image based on the video signal received through the main communication path.

The video display apparatus includes a main communication path adjusting device for adjusting the spatial matching (including positional matching and/or non-positional matching) of the main communication path between the transmitting and receiving sets based on first and second control signals, a sub communication path transmitter for transmitting a reception quality signal representing the reception quality of the video signal at the receiving set to the transmitting set through a sub communication path including a non-directional communication medium different from the main communication path, a test video analyzer for having a prescribed test video image displayed by the display portion, receiving light from the displayed video image and analyzing the test video image, thereby generating an analysis result signal, and a controller for generating the first control signal based on the reception quality signal transmitted from the sub communication path transmitter and the second control signal based on the analysis result signal.

DETAILED DESCRIPTION OF THE PREFERRED EMBODIMENTS

A video display apparatus according to an embodiment of the invention will now be described in conjunction with a block diagram in FIG. 1.

The video display apparatus according to the embodiment is a so-called large screen display, and includes a transmitting set 10 and a receiving set 20 as shown in the Figure. Note that the transmitting set 10 and the receiving set 20 are provided for example in the same room.

Figure 1:
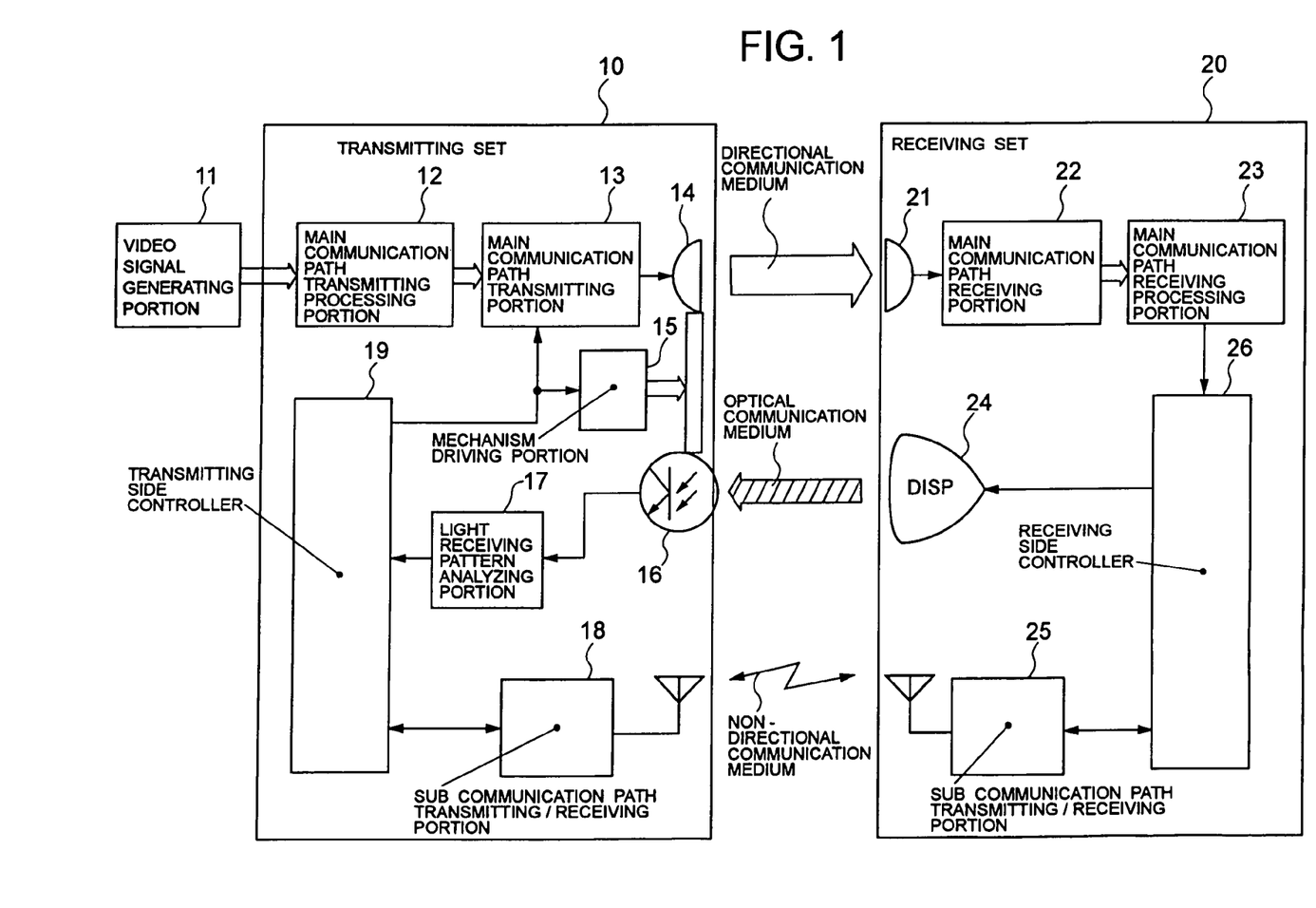
FIG. 1 is a schematic block diagram of an embodiment of the video display apparatus according to the invention.

In FIG. 1, the communication path to transmit a video signal from the transmitting set 10 to the receiving set 20 is referred to as a "main communication path." The communication path is a one-way path from the transmitting set 10 to the receiving set 20, and a communication medium used here has directivity. In order to transmit video signals for an enormous amount of information, the communication path must be a so-called "high rate" path having a large communication capacity per unit time.

According to the embodiment, a microwave in the SHF band (of at least 3 GHz) for example that is directional and allows a large amount of information to be transmitted at a high speed is considered as a medium for the communication path to satisfy the requirement. Note however that the embodiment is not limited to this and optical wireless transmission with infrared rays for example having the same characteristic as the microwave radiation may be used as the medium for the main communication path.

There is a communication path between the transmitting set 10 and the receiving set 20 that transmits/receives various pieces of control data between the sets, and this path is referred to as a "sub communication path." The sub communication path is capable of bi-directional communication because of how it is used, and the communication medium used here is defined as non-directional. Note that the sub communication path is used only for transmitting the control data, and therefore needs only be a so-called "low rate" communication path.

For the medium for the communication path according to the embodiment, a non-directional low power wave like the one used for example for Bluetooth or a wireless LAN is used. Note however that the embodiment is not limited to this, and for example a non-directional optical wireless system may be used as a sub communication path. Other wire communication mediums such as lamp light wire and telephone wire may be used.

The configuration of the transmitting set 10 shown in FIG. 1 will now be described. Note that a video signal generating portion 11 is a video software supply device such as a tuner for satellite broadcasting or a DVD player. As shown in FIG. 1, the video signal generating portion 11 may be provided outside the transmitting set 10 or the function can be stored in the transmitting set 10.

The transmitting set 10 mainly includes a main communication path transmitting processing portion 12, a main communication path transmitting portion 13, a transmitting side directional antenna 14, a mechanism driving portion 15, a video signal light receiving portion 16, a light receiving pattern analyzing portion 17, a transmitting side sub communication path transmitting/receiving portion 18, and a transmitting side controller 19.

A video signal from the video signal generating portion 11 is inputted to the main communication path transmitting processing portion 12 (hereinafter simply as the "processing portion 12") through a prescribed interface circuit (not shown).

In the processing portion 12, the input signal is subjected to necessary encoding for error correction by an error correction encoder (not shown) and also subjected to encoding for modulation if necessary by a modulation encoder (not shown). The signal is then modulated in a prescribed manner by a modulator (not shown).

The main communication transmitting portion 13 (hereinafter simply as the "transmitting portion 13") superposes the output signal from the processing portion 12 on a microwave serving as a communication medium for transmission. Note that the output transmitted from the transmitting portion 13 is controlled in response to a control signal from the controller that will be described.

The transmitting side directional antenna 14 (hereinafter simply as the "antenna 14") is a small size antenna with high directivity such as a parabolic antenna or an antenna array. The antenna 14 converges a microwave output from the transmitting portion 13 for radiation to the receiving antenna on the side of the receiving set 20.

The mechanism driving portion 15 holds and drives the antenna 14 using a driving source such as a stepping motor and an electromagnetic actuator in order to control the direction of the antenna 14 as desired.

The video signal light receiving portion 16 (hereinafter simply as the "light receiving portion 16") includes a photoelectric conversion element such as a phototransistor and a photodiode, and an amplifier circuit and a control circuit associated with the element, and receives light from a prescribed test pattern displayed at the display screen of the receiving set 20.

Note that the light receiving portion 16 is provided on the mechanism driving portion 15, and set so that the direction of the highest response in its directivity curve at the time of receiving light is the same direction as that of the antenna 14.

The light receiving pattern analyzing portion 17 (hereinafter simply as the "analyzing portion 17") carries out a prescribed analyzing processing for an output signal from the light receiving portion 16, and notifies the controller of the result.

The transmitting side sub communication path transmitting/receiving portion 18 (hereinafter simply as the "transmitting/receiving portion 18") is a radio transmitting/receiving circuit that uses a non-directional, low power radio wave like the one used for Bluetooth or a wireless LAN as described above as a communication medium. As can be seen from FIG. 1, a circuit identical to the transmitting/receiving portion 18 is provided in the receiving set 20. A so-called sub communication path is provided between these two transmitting/receiving portions.

Various control data pieces related to the main communication path generated in the transmitting side controller 19 are sent to the transmitting/receiving portion 18, then provided with prescribed error correction codes and modulated in a prescribed manner. The resultant signal is then transmitted to the receiving set. Similarly, the control data received from the receiving set is demodulated in a prescribed manner, corrected for errors, and then transmitted to the CPU of the transmitting side controller 19.

The transmitting side controller 19 (hereinafter simply as the "controller 19") is a circuit that mainly includes a microcomputer, a storage circuit such as a ROM and a RAM, and a peripheral circuit thereof and performs centralized control of the above elements.

Note that the transmitting set 10 also includes various other circuits related to control of video images or audio sounds to be transmitted in addition to the circuits described above. However, these other circuits are not directly relevant to the invention and therefore not shown or described.

The configuration of the receiving set 20 will now be described.

The receiving set 20 mainly includes a receiving side directional antenna 21, a main communication path receiving portion 22, a main communication path receiving processing portion 23, a display screen 24, a receiving side sub communication path transmitting/receiving portion 25 and a receiving side controller 26.

The receiving side directional antenna 21 (hereinafter simply as the "antenna 21") is a directional antenna identical to the antenna 14 in the receiving set 10 and captures a main beam of microwave radiated from the transmitting side antenna 14.

The main communication path receiving portion 22 (hereinafter simply as the "receiving portion 22") is a circuit that receives and detects the microwave from the receiving set 10 captured by the antenna 21.

The detection output of the receiving portion 22 is supplied to the main communication path receiving processing portion 23 (hereinafter simply as the "processing portion 23"). The processing portion 23 carries out prescribed error correction to the detection output, and demodulates and decodes the output. The processing portion 23 thus reproduces the video signal transmitted from the transmitting set 10.

At the same time, data including the receiving level of the signal and an error rate detected during correcting the errors in the received signal is outputted from the processing portion 23 to the receiving side controller 26 that will be described.

The display screen 24 is a display panel such as a PDP or a liquid crystal display panel that displays a received image reproduced by the above process of receiving the video signal.

The receiving side sub communication path transmitting/receiving portion 25 (hereinafter simply as the "transmitting/receiving portion 25") is a circuit identical to the transmitting/receiving portion 18 in the transmitting set 10. The transmitting/receiving portion 25 has the same configuration and operates in the same manner as the portion 18 and therefore will not be described.

The receiving side controller 26 (hereinafter simply as the "controller 26") is a circuit that mainly includes a microcomputer, a storage circuit such as a ROM and a RAM, and a peripheral circuit thereof, and performs centralized control of the operation of the elements of the receiving set 20.

Note that similarly to the transmitting side, the receiving set 20 also includes various other circuits such as a driving circuit for the display screen and a circuit for display control in addition to those shown in FIG. 1. These circuits are however not directly relevant to the invention and will not be described.

The operation of the video display apparatus shown in FIG. 1 will now be described in conjunction with the process flowchart in FIG. 2. It is understood that to achieve the following operation, the transmitting and receiving sets 10 and 20 are positioned in the range that allows the spatial matching in the main communication path between the transmitting and receiving sets to be adjusted. It is needless to say that there are no disturbances in setting the main communication path between the sets.

Once the power is turned on at the transmitting and receiving sets 10 and 20 or the reset processing is carried out at the both sets, the controller 19 of the transmitting set 10 issues a "coarse adjustment display pattern request" instruction to the transmitting/receiving portion 18 (step 01). Herein, the "coarse adjustment" refers to approximate adjustment (mainly about the direction) to the main communication path between the transmitting and receiving sets.

The transmitting/receiving portion 18 transmits a prescribed signal to the transmitting/receiving portion 25 in the receiving set 20 through the sub communication path in response to this instruction. The sub communication path uses a non-directional communication medium as described above, and therefore the signal from the transmitting set 10 can surely be received at the receiving set 20 if the transmitting and receiving sets are not exactly opposed to each other.

Upon receiving the signal, the transmitting/receiving portion 25 in the receiving set 20 notifies the controller 26 of the reception. The control portion 26 generates a prescribed video pattern for coarse adjustment, and outputs the pattern on the display screen 24 (step 21).

The video pattern displayed at the display screen 24 is transmitted to the transmitting set 10 through an optical communication medium, i.e., through a normal visible light beam and converted into an electrical signal at the light receiving portion 16 of the transmitting set 10 for output to the analyzing portion 17 (step 02). The analyzing portion 17 carries out prescribed analysis to the signal, and notifies the controller 19 of the result (step 03).

The controller 19 determines the positional relation between the transmitting and receiving sets based on the analysis result (step 04). If the transmitting and receiving sets are in appropriate positional relation, that is these sets are exactly opposed, and the positional or directional matching of the main communication path is substantially achieved between the sets, the control proceeds to the next fine adjustment sequence (from step 05 on). Meanwhile, if the directional matching of the main communication path between the transmitting and receiving sets is not attained, the controller 19 proceeds to step 06 and carries out coarse adjustment to the directional matching of the main communication path between the transmitting and receiving sets.

The elements that carry out the coarse directional adjustment to the image display apparatus according to the first embodiment of the invention will now be described in conjunction with FIG. 3.

Figure 3:
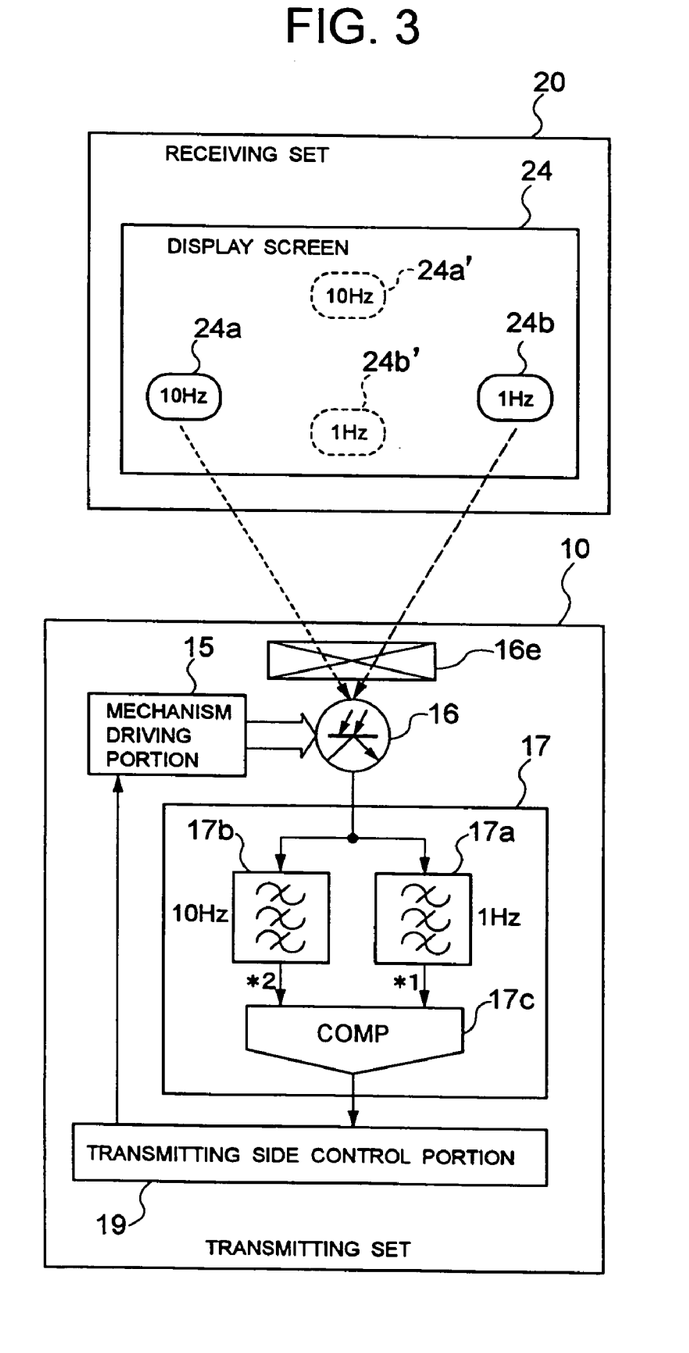
FIG. 3 is a view showing a first example of coarse adjustment to the main communication path in the video display apparatus in FIG. 1.

The embodiment shown in FIG. 3 employs a method of displaying two patterns having different flashing cycles in the right and left parts of the display screen 24 as a video pattern for the coarse adjustment.

In this case, in the above described step 21, the controller 26 in the receiving set 20 displays a video image as shown in FIG. 3 on the display screen 24. The video pattern includes for example a pattern 24a flashing at 10 Hz in the left part of the display screen 24 viewed from the front and a pattern 24b flashing at 1 Hz in the right part viewed from the front. It is needless to say that the flashing cycles for the patterns are not limited to the above values, and may be any values as long as the values can readily be separated by band-pass filters that will be described.

Meanwhile, the transmitting set 10 collects a light beam from the image using an optical system 16e and forms an image at the light receiving surface of the light receiving element in the light receiving portion 16. The output signal from the light receiving portion 16 is branched for supply to two band-pass filters in the analyzing portion 17. The bandpass filter 17a has its band pass center frequency set to 1 Hz, while the band-pass filter 17b has its band pass center frequency set to 10 Hz.

More specifically, the signal at the flashing cycle of 10 Hz received from the pattern 24a passes only through the band-pass filter 17b, while the signal at 1 Hz received from the pattern 24b is passed only through the band-pass filter 17a. The levels of the signals passed through these bandpass filters are compared by a comparator 17c and the controller 19 is notified of the result of comparison as an output from the analyzing portion 17.

Figure 4A:
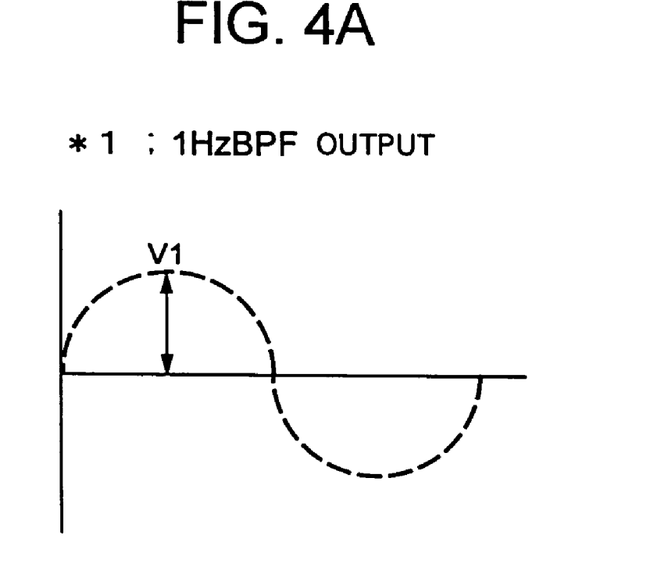
FIGS. 4A and 4B are charts showing the output signal levels of band-pass filters 17A and 17B, respectively.
Figure 4B:
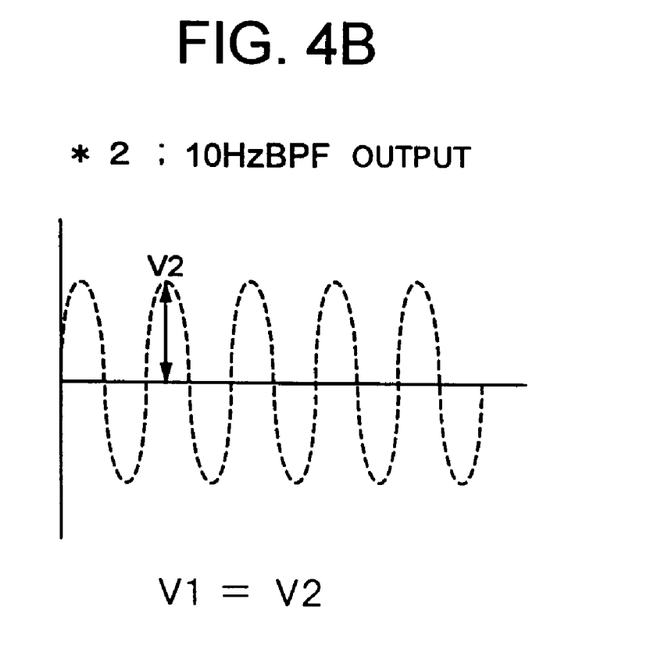

As described above, the light receiving portion 16 and the antenna 14 are provided on the mechanism driving portion 15 so that the directions of the highest response in individual directivity curves are made the same between them. As a result, when the transmitting set 10 is exactly opposed to the display screen 24 of the receiving set 20, and the directivity direction in the main communication path is consistent between these sets, the light receiving portion 16 is also directed to the receiving set 20. Therefore, the quantities of light arriving at the light receiving portion 16 from the above two patterns are substantially equal, and the output levels of the band-pass filters 17a and 17b are equal as shown in FIGS. 4A and 4B, respectively.

Based on the analysis result by the comparator 17c which represents the quality of the spatial matching, the controller 19 determines that good positional relation is established between the transmitting and receiving sets if the output levels of the band-pass filters are equal. In other words, the controller determines that the directional matching of the main communication path between the sets is achieved (step 04).

Figure 5:
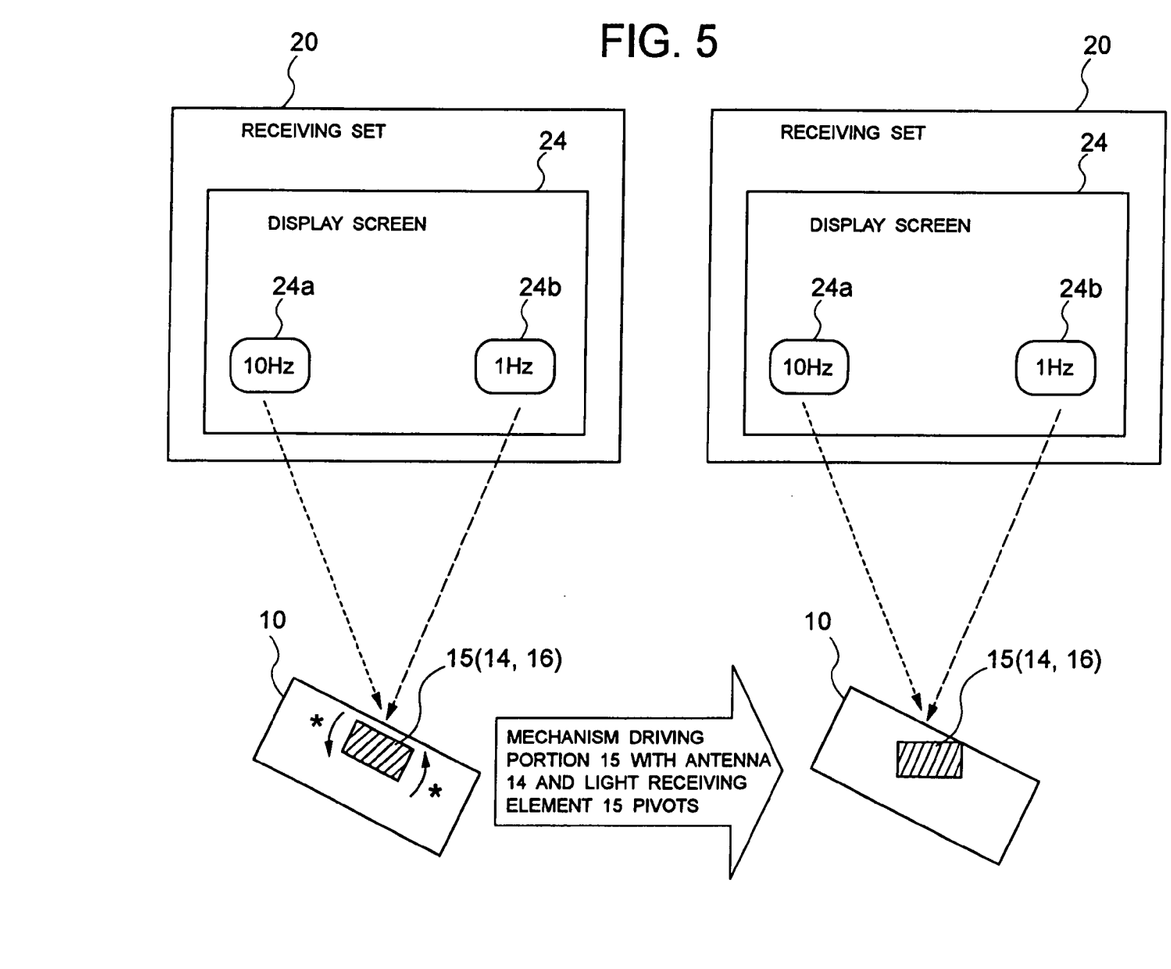
FIG. 5 is a view illustrating the process in the first example as shown in FIG. 3.
Figure 6A:
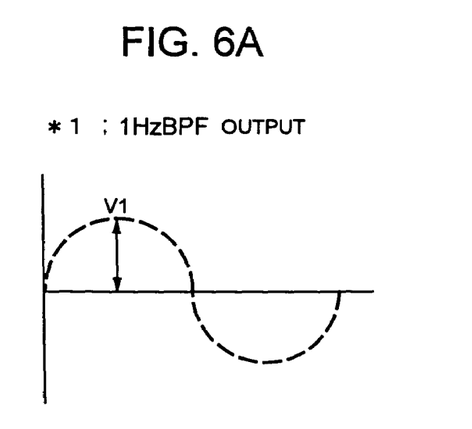
FIGS. 6A and 6B and FIGS. 7A and 7B are charts showing the output signal levels of the band-pass filters 17A and 17B, respectively in the process shown in FIG. 5.
Figure 6B:
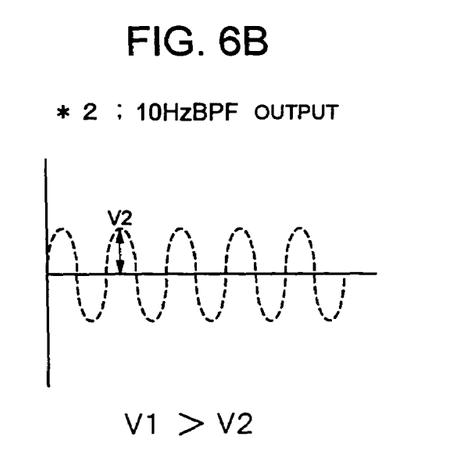

Meanwhile, when the sets are in the positional relation as shown in the left part of FIG. 5, the light receiving portion 16 of the transmitting set 10 is directed toward the pattern 24b on the display screen. Therefore, more light beams necessarily arrive at the light receiving portion 16 from the pattern 24b (1 Hz) than from the pattern 24a (10 Hz). As a result, as shown in FIGS. 6A and 6B, the output level of the band-pass filter 17b (10 Hz) is lower than the output level of the band-pass filter 17a (1 Hz). The comparator 17c detects the imbalance between the output levels of the bandpass filters and notifies the controller 19 of the imbalance. Based on the information the controller 19 determines in the step 04 that the positional relation between the sets is not appropriate, and proceeds to the step 06 for carrying out coarse adjustment to the directional matching of the main communication path between the sets.

The operation of the coarse adjustment in connection with the example in FIG. 5 will be described.

To begin with, the CPU of the controller 19 calculates how much and in which direction the light receiving portion 16 is inclined from the normal directivity direction based on the difference between the output levels of the band-pass filters. The controller 19 generates a control signal to correct the inclination in the direction based on the result of calculation, and supplies the generated signal to the mechanism driving portion 15. Thus, the mechanism driving portion 15 is pivoted toward a desired direction so that the correction of the direction of the light receiving portion 16 is achieved.

Figure 7A:
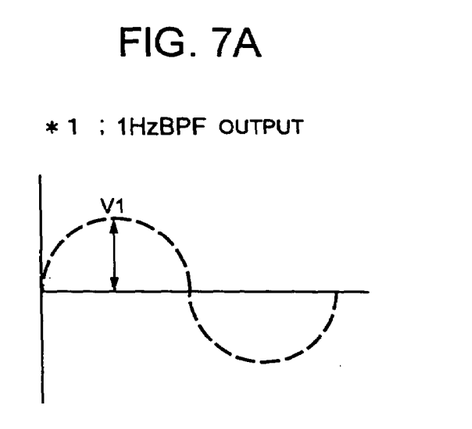
Figure 7B:
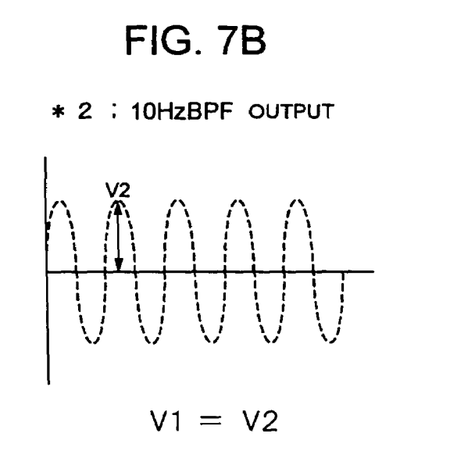

In the illustrated example in the left part of FIG. 5, the mechanism driving portion 15 is pivoted in the direction denoted by the arrow * in FIG. 5. The control operation is carried out by feedback operation based on the analysis result by the comparator 17c inputted by the controller 19 through the analyzing portion 17 as shown in FIG. 2 in the flowchart of the loop process carried out in the order of S02, S03, S04, S06, S02, . . . ("S" stands for "step.") The control operation ends when the analyzing portion 17 detects that the outputs from the band-pass filters are balanced as shown in FIGS. 7A and 7B. Consequently, when the control operation ends, the light receiving portion 16 is correctly directed to the display screen 24 as shown in the right part of FIG. 5, and the antenna 14 provided in the same direction at the mechanism driving portion 15 is necessarily directed to the receiving set 20.

Note that according to the embodiment, there are two patterns in the right and left parts of the display screen 24, while there may be patterns 24a' and 24b' in the top and bottom parts of the screen as shown in FIG. 3 and the direction shift in the vertical direction may be corrected. Alternatively, the above horizontal and vertical arrangements may be combined.

According to the embodiment, patterns having different flashing cycles are provided in the right and left parts of the same screen, while odd and even fields of the display screen may be used to allow only one pattern to be displayed in the left or right part in each field. The transmitting set can recognize whether the presently displayed screen is of an odd field or an even field, and therefore the light quantity of a pattern detected in an odd field can be compared to the light quantity of a pattern detected in an even field. In this way, the inclination in the direction of the light receiving portion 16 can be corrected similarly to the above embodiment. Meanwhile, the pattern display by this time-divisional method requires only one kind of flashing cycle for patterns to be displayed, which can reduce the number of band-pass filters at the analyzing portion 17.

Now, the elements for carrying out coarse direction adjustment to the main communication path according to a second embodiment will be described in conjunction with FIG. 8.

Figure 8:
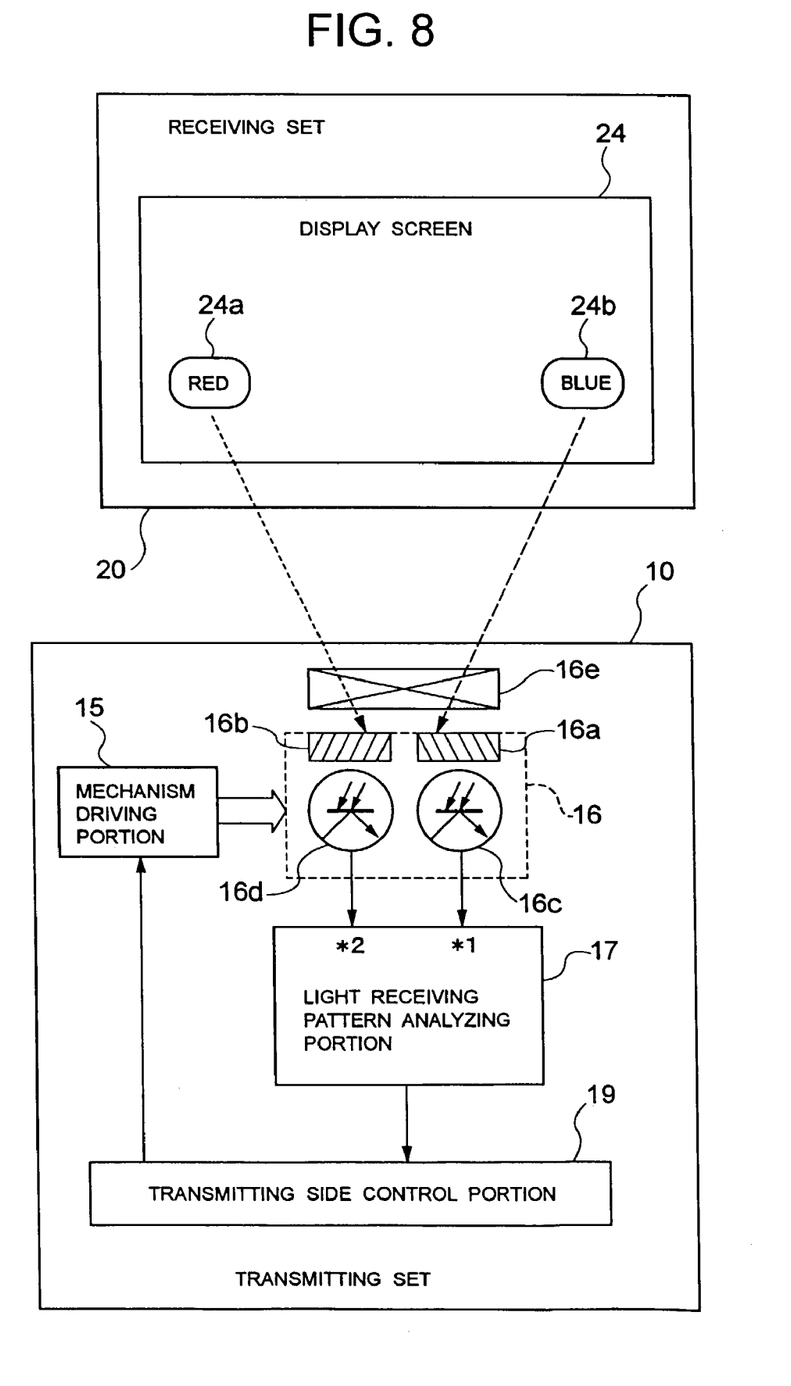
FIG. 8 is a view of the elements for carrying out coarse adjustment to the main communication path in the video display apparatus shown in FIG. 1 according to a second embodiment of the invention.

The second embodiment shown in FIG. 8 displays patterns in two different colors as a video pattern for coarse adjustment in the right and left parts of the display screen 24.

Figure 2:
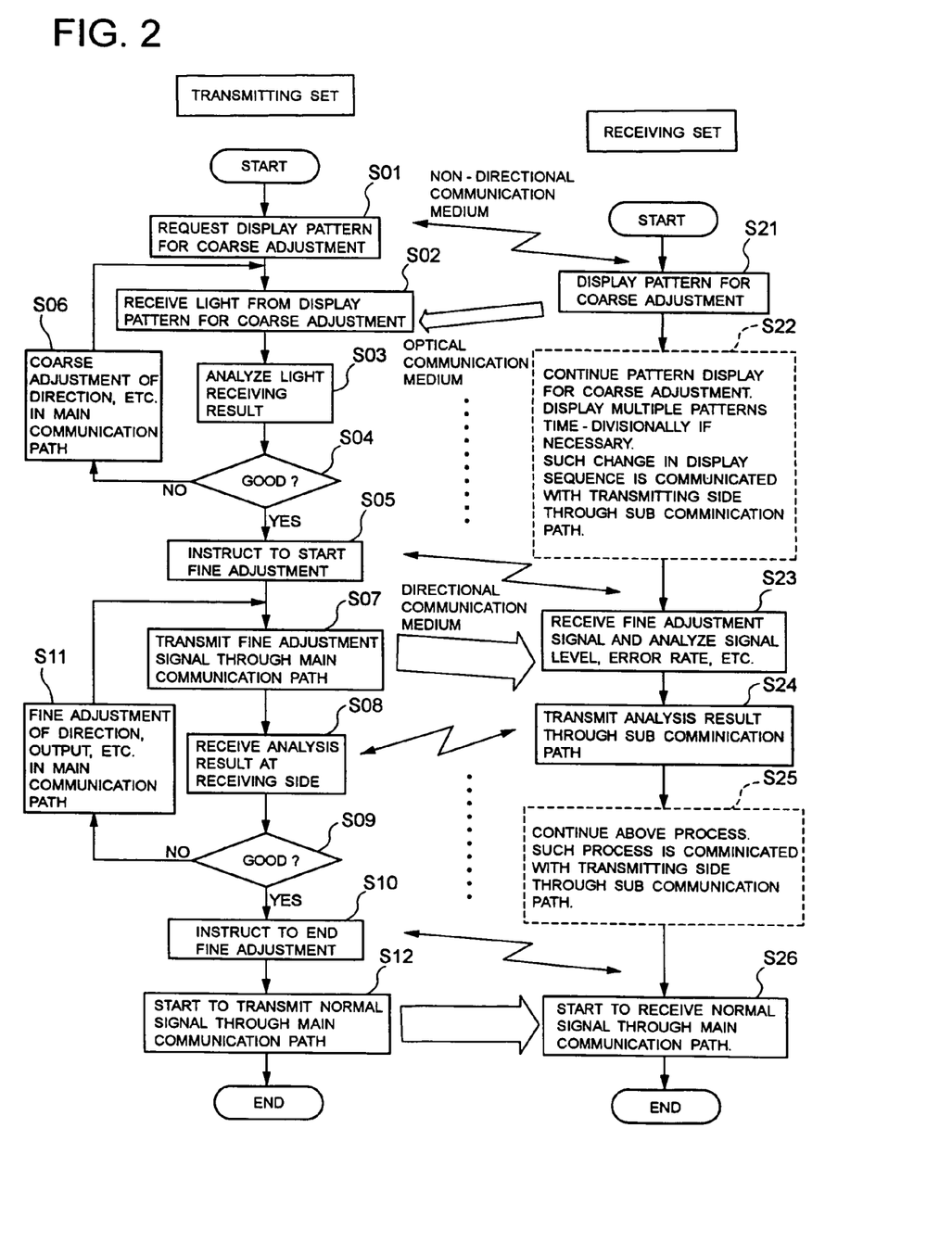
FIG. 2 is a schematic flowchart illustrating the adjustment to a main communication path in the video display apparatus according to the invention.

In this case, in the step 21 in the flowchart in FIG. 2, the controller 26 of the receiving set 20 displays on the display screen 24 a video pattern having a red pattern 24a in the left part of the screen when viewed from the front and a blue pattern 24b in the right part as shown in FIG. 8. Note that the colors of the patterns are not limited to these two colors, but various other colors can be used as long as the two patterns can be distinguished from one another.

As shown in FIG. 8, according to the embodiment, the light receiving portion 16' of the transmitting set 10 includes an optical system 16e, a combination of a blue transmitting filter 16a and a light receiving element for detecting blue 16c, and a combination of a red transmitting filter 16b and a receiving element for detecting red 16d. Herein, the blue transmitting filter 16a and the red transmitting filter 16b are optical filters that pass only blue and red light, respectively. The light converged by the optical system 16e and transmitted through each filter is converted into an electrical signal by the light receiving element 16c or 16d, and output to the comparator of an analyzing portion 17'. The analyzing portion 17' compares the levels of the two output signals and notifies the controller 19 of the result of comparison.

Figure 9A:
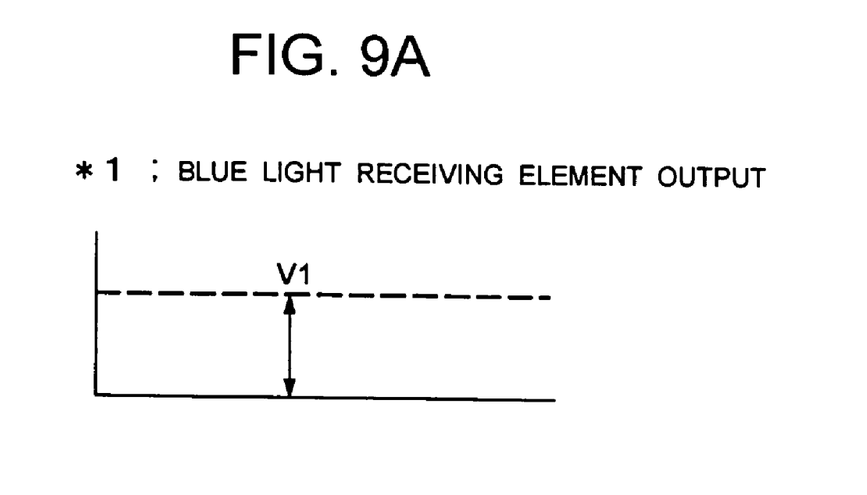
FIGS. 9A and 9B are charts showing the output signal levels of light receiving elements 16c and 16d, respectively.
Figure 9B:
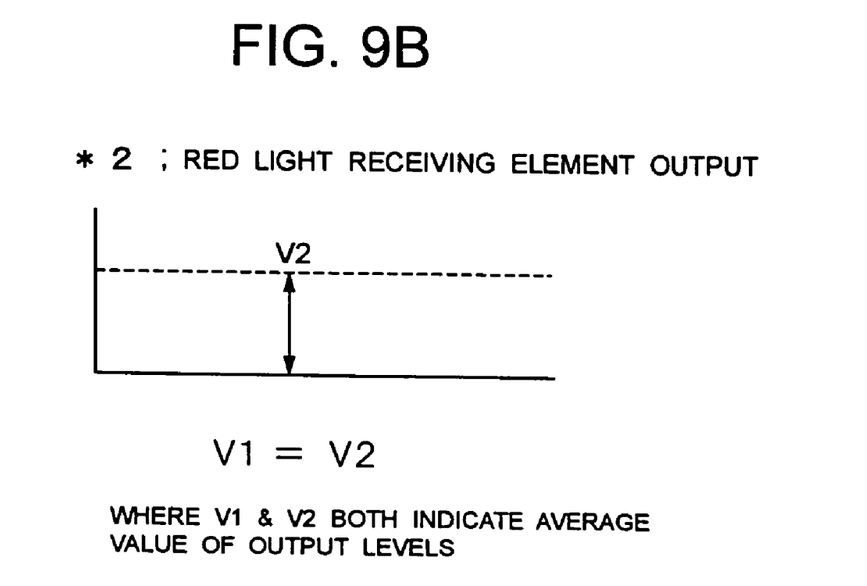

As shown in FIG. 8, when the transmitting set 10 and the display screen 24 of the receiving set 20 are exactly opposed, and the directional matching between the sets is achieved, the quantities of light arriving at the light receiving portion 16 from the blue and red, two patterns are substantially equal, and the levels of the output signals are equal as shown in FIGS. 9A and 9B. Meanwhile, when there is a shift in the direction between the sets, the output levels of the two signals are imbalanced.

Figure 10A:
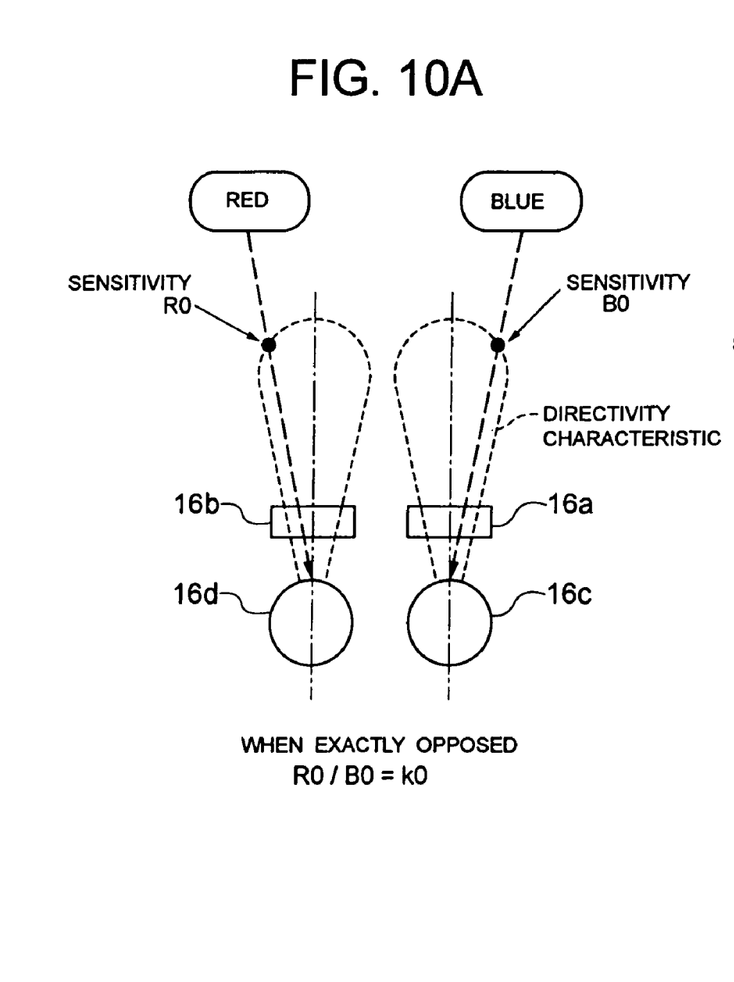
FIGS. 10A and 10B are diagrams showing the principle of operation according to the second embodiment shown in FIG. 8.
Figure 10B:
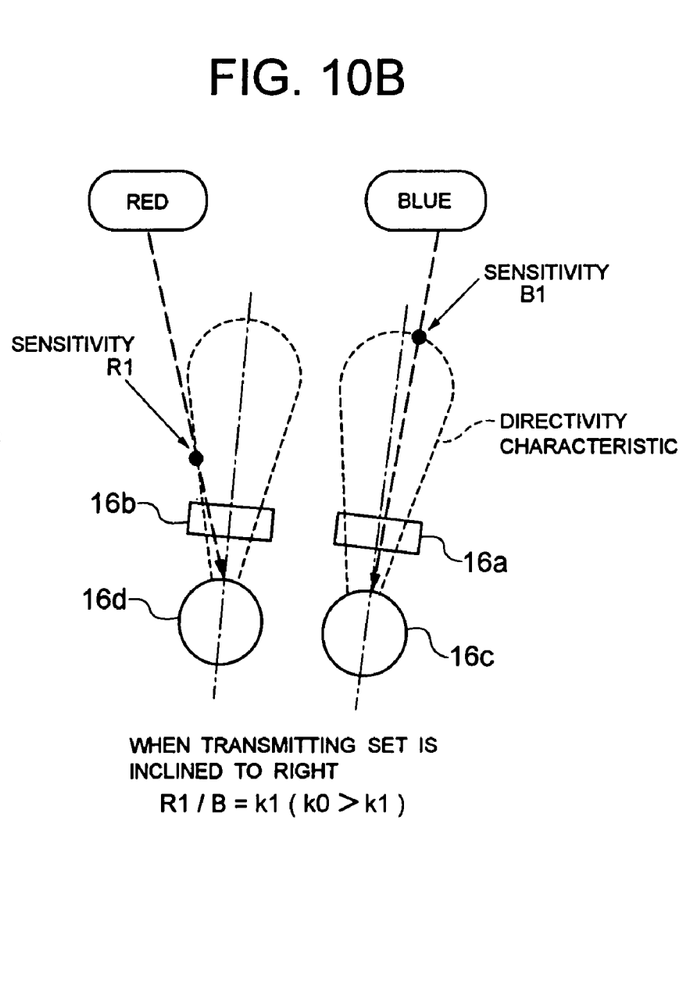

This is illustrated in detail in FIGS. 10A and 10B. Note that FIGS. 10A and 10B schematically show what is shown in FIG. 8, and the elements not directly related to the description such as the optical system 16e and the mechanism driving portion 15 are not shown.

When the transmitting and receiving sets are exactly opposed, as shown in FIG. 10A, the shifts of the directivity curves of the light receiving elements 16c and 16d with respect to light emitted from the display screen 24 are matched, and sensitivities B0 and R0 are substantially equal. When the transmitting set is inclined to the right, the sensitivity of the light receiving element 16c increases to B1 as shown in FIG. 10B, while the sensitivity of the light receiving element 16d is lowered to R1.

The output levels of signals from the light receiving elements are in proportion with the sensitivities thereof, and therefore the sensitivity ratios R0/B0 and R1/B1 represent the balance of the output levels in respective cases.

The controller 19 carries out control of the mechanism driving portion 15 to keep the output signal levels balanced, and allows the directional matching between the sets to be achieved. Note that the control process is the same as the coarse adjustment according to the first embodiment and therefore will not be described repeatedly.

By the coarse adjustment according to the first and second embodiments described above, a prescribed video pattern is displayed on the display screen of the receiving set 20, and light from the pattern is received by a light receiving element provided at the transmitting set 10. In this way, the coarse adjustment to the directional matching in the main communication path can be carried out. As a result, various test patterns more useful in the coarse adjustment can be displayed as compared to guide light using a conventional simple light emitting element.

When the display screen may be used as the light emitting source for the guide light, an additional light emitting element for emitting the guide light is not necessary at the receiving set. As compared to guide light by a simple light emitting element such as an LED, broad guide light having a large quantity of light can be provided.

Various test patterns used for the coarse adjustment may be predetermined test patterns by a so-called test pattern generator stored in the controller 26 of the receiving set 20. The transmitting set 10 may use the sub communication path to transmit information related to prescribed test patterns to the receiving set 20.

In the flowchart in FIG. 2, when the coarse adjustment described above ends, the control portion 19 of the transmitting set 10 proceeds to step 05, and generates an instruction "to start fine adjustment" for output to the transmitting/receiving portion 18. Herein, the "fine adjustment" refers to fine adjustment (further adjustment about the direction and the transmission output, or adjustments for the positional matching and the non-positional matching) for the main communication path carried out between the transmitting and receiving sets.

The transmitting/receiving portion 18 transmits a prescribed control signal based on the instruction to the transmitting/receiving portion 25 in the receiving set 20 through the sub communication path.

Upon receiving the control signal, the transmitting/receiving portion 25 of the transmitting set 20 notifies the controller 26 of the reception, and the controller 26 enters the fine adjustment mode to carry out fine adjustment to the main communication path between the sets.

Meanwhile, the controller 19 of the transmitting set 10 proceeds to step 07, sends an instruction to the transmitting portion 13, and transmits a fine adjustment test signal in a particular examination code to the receiving set 20 using a microwave in the main communication path.

The directional matching of the main communication path between the transmitting and receiving sets is substantially achieved by the already carried out coarse adjustment. Therefore, the main beam of microwave superposed with the test signal radiated from the antenna 14 of the transmitting set 10 is mostly surely captured by the antenna 21 of the receiving set 20.

The receiving set 20 detects the microwave captured by the antenna 21 at the receiving portion 22, demodulates/decodes the signal at the processing portion 23 and reproduces the fine adjustment test signal from the transmitting set 10. The processing portion 23 then notifies the controller 26 of the received level of the test signal and the error rate at the time of demodulating (step 23).

The controller 26 transmits these pieces of data to the transmitting/receiving portion 25, and then to the transmitting/receiving portion 18 of the transmitting set 10 via the sub communication path by the non-directional communication medium (step 24). Meanwhile, the receiving set 20 repeatedly carries out the operation until the end of the fine adjustment processing mode.

The controller 19 of the transmitting set 10 analyzes the content of data received through the transmitting/receiving portion 18 from the receiving set 20 in step 08 and ends the fine adjustment processing if the received state in the main communication path in the receiving set 20 is good. Meanwhile, the controller 19 proceeds to the fine adjustment processing in step 11 if the state is not good (step 09).

The fine adjustment processing in the step 11 may be carried out by various methods. When the error rate at the receiving set 20 is large for example, a control signal to increase the transmission output is supplied to the transmitting portion 13 from the controller 19. If the error rate is sufficiently small, a control signal to reduce the transmission output may be supplied in order to reduce the transmission distortion and the power consumption. Similarly to the coarse adjustment, a control signal may be supplied from the controller 19 to the mechanism driving portion 15 to pivot the driving portion, and the adjustment of direction to minimize the error rate at the receiving set 20 may be carried out. Similarly, a control signal may be supplied from the controller 19 to the mechanism driving portion 15 to pivot the driving portion and the control to maximize the receiving level of the test signal at the receiving set 20 may be carried out.

Only one kind of the fine adjustment processing may be carried out independently or a number of such processings may be combined according to prescribed priorities and sequentially carried out in a time-divisional manner.

The fine adjustment allows the transmission output from the transmitting set 10 to be set to an optimum value, and the spatial matching of the main control path between the sets can be attained more precisely than the previous coarse adjustment.

It is understood that the control operation in the fine adjustment from the controller 19 to the transmitting portion 13 and the mechanical driving portion 15 is carried out while the controller 19 feeds back the receiving state of the main communication path available through the sub communication path as shown in the flowchart in FIG. 2 of the loop process carried out in the order of S07, S08, S09, S011, S07, . . . ("S" stands for "step.")

When the fine adjustment as described above ends, the controller 19 proceeds to step 10, and notifies the receiving set 20 of the end of fine adjustment through the sub communication path. Thus, the controller 26 of the receiving set 20 ends the fine adjustment processing mode and enters the receiving mode of a normal video signal through the main communication path (step 26). Similarly, the transmitting set 10 ends the fine adjustment and starts transmitting a video signal through the main communication path (step 12).

In the embodiments described above, the main communication path between the transmitting and receiving sets is adjusted when the video display apparatus is turned on or reset. Meanwhile, the invention is not limited to these embodiments. The video display apparatus according to the invention has a sub communication path separate from the main communication path for transmitting control data, and therefore control data can constantly be exchanged between the sets, and fine adjustment can regularly be carried out.

Rather than determining such regular intervals, fine adjustment may be carried out when the error rate in the main communication path receiving portion in the receiving set 20 for example or the receiving level is out of a prescribed threshold range. This can always keep the transmission quality good in the main transmission path between the transmitting and receiving sets.

Note that in the above description, the adjustment to the spatial matching related to the main communication path is carried out using the transmitting set, while the invention is not limited to this and the receiving set may be used. In this case, the directional antenna in the receiving set may be pivotable by the mechanism driving portion and the directivity in the main communication path may be adjusted.

When light is used as a communication medium for the main communication path, the light emitting portion on the transmitting side may be a non- or low directional light emitting element and the directional light receiving portion on the receiving, side may capture light from the transmitting portion. Alternatively, a light beam from the light emitting portion of the transmitting set may irregularly be reflected from the ceiling or the like, and the reflected light beam may be captured by the receiving set.

Prescribed processing procedure may be determined between the transmitting and receiving sets, and the spatial matching of the main communication path may be adjusted at both sets.

According to the embodiment, only the one pair of transmitting and receiving portions at the transmitting and receiving sets is used, while the invention is not limited to this and a plurality of transmitting portions may be used in the transmitting set. In this case, test codes at the time of fine adjustment to the main communication path may be set to different patterns for individual transmitting portions, and the spatial matching may be adjusted on the receiving set side, so that a plurality of receiving level peaks corresponding to the transmitting portions can be identified and detected. Therefore, the spatial matching of the main communication path can more readily be adjusted.

In addition, a plurality of receiving portions may be provided in the receiving set. In this manner, when the communication medium for the main communication path is light and one receiving portion is affected by room light or diffracted light from the display screen, the degradation in the receiving characteristic can be covered by the other receiving portions. A so-called "diversity function" to select a receiving portion with the best receiving characteristic among the plurality of receiving portions may be employed.

The sub communication path according to the invention may be a wire network established by a carrier line using an electric light line, a telephone line, or an optical cable other than the wireless medium described above. More specifically, the non-directional communication medium includes any communication medium without spatial directivity.

Note that in FIG. 5 according to the embodiment, red and blue patterns are provided apart from one another on the display screen by way of illustration, but these patterns may be displayed overlapped on one another. In this case, the color of the emitted light on the screen is magenta produced by mixing the two colors, so that the quantities of light of the colors divided by the filters and coming into the light receiving elements are equal, when the corresponding points on the directivity curves of the light receiving portions are exactly opposed to the display screen. However, if the directly opposite position changes, change of the light receiving levels occurs due to the directivity of the light receiving portions, and a shift in the direction between the display screen and the light receiving portions can be detected. More specifically, the relation between the patterns on the display screen and the light receiving portions needs only to allow the direction of the light receiving portions relative to the display screen to uniformly be determined.

As in the foregoing, according to the invention, in a video display apparatus including separate transmitting and receiving sets, the main communication path that transmits video signals between the sets can readily and automatically be adjusted.

This application is based on Japanese Patent Application No. 2001-360716 which is herein incorporated by reference.

What is claimed is:

1. A video display apparatus comprising a transmitting set that transmits a video signal through a main communication path including a directional wireless communication medium, and a receiving set including a display portion that displays a video image based on said video signal received through said main communication path, comprising:
   a main communication path adjusting device for adjusting a spatial matching including positional matching of said main communication path between said transmitting and receiving sets based on first and second control signals;
   a sub communication path transmitter for transmitting a reception quality signal representing the reception quality of said video signal at said receiving set to said transmitting set through a sub communication path including a non-directional communication medium different from said main communication path;
   a test video analyzer for having a prescribed test video image displayed by said display portion, receiving light from the displayed video image and analyzing said test video image, thereby generating an analysis result signal; and
   a controller for generating said first control signal based on said reception quality signal transmitted from said sub communication path transmitter and said second control signal based on said analysis result signal.

2. The video display apparatus according to claim 1, wherein
   said main communication path adjusting device comprises a direction controller that controls the direction of a transmitting antenna movably mounted on said transmitting set, and
   an output controller that controls the transmission output of said transmitting antenna, and
   said direction controller and said output controller are controlled based on said first control signal and said direction controller is controlled based on said second control signal.

3. The video display apparatus according to claim 1, wherein
   said test video analyzer comprises a light receiving portion that receives light from a test video image displayed at said display portion and generates a light receiving signal, and
   an analyzing portion that analyzes said light receiving signal and generates an analysis result signal representing a quality of the spatial matching of the main communication path between said transmitting and receiving sets.

4. The video display apparatus according to claim 3, wherein
   said test video image has two kinds of patterns displayed in the screen of said display portion and having different flashing cycles,
   said light receiving portion extracts light received from said two kinds of patterns using filters having different passing bands and generates two different light receiving signals, and
   said analyzing portion detects the imbalance between said two different light receiving signals and generates said analysis result signal, said analysis result signal representing the quality of the spatial matching of said main communication path based on the magnitude of the imbalance.

5. The video display apparatus according to claim 3, wherein
said test video image has two kinds of patterns in different colors displayed in the screen of said display portion,
said light receiving portion extracts light received from said two kinds of patterns using optical filters that pass different kinds of light, and generates two different light receiving signals, and
said analyzing portion detects the imbalance between said two different light receiving signals and generates said analysis result signal, said analysis result signal representing the quality of the spatial matching of the main communication path based on the magnitude of the imbalance.

6. The video display apparatus according to claim 1, wherein
said test video analyzer has said test video image displayed by the display portion in response to turning on the apparatus or an instruction thereof.

7. The video display apparatus according to claim 3, wherein said main communication path adjusting device comprises a direction controller that controls the direction of a transmitting antenna, and said transmission antenna and said light receiving portion are mounted on a part movably supported on said transmitting set.

8. The video display apparatus according to claim 1, wherein said main communication path adjusting device adjusts a spatial matching including positional matching and non-positional matching of said main communication path between said transmitting and receiving sets based on first and second control signals.

* * * * *